(No Model.)
J. M. THOMPSON.
CLOVER HULLER.
No. 317,595. Patented May 12, 1885.
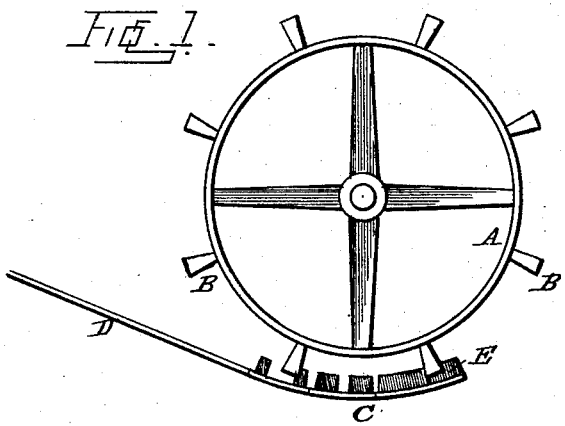
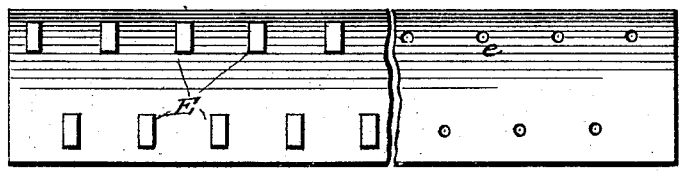
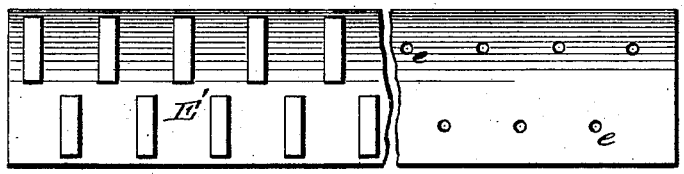
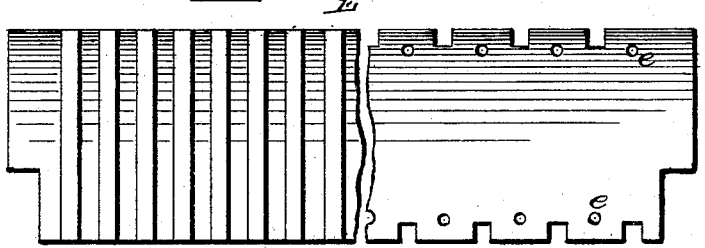
WITNESSES:
Fred. G. Dieterich.
Henry G. Dieterich
INVENTOR.
James M. Thompson
By Daniel Breed
ATTORNEY.
N. PETERS, Photo-Lithographer, Washington, D. C.

UNITED STATES PATENT OFFICE.

JAMES M. THOMPSON, OF GARRISON, IOWA.

CLOVER-HULLER.

SPECIFICATION forming part of Letters Patent No. 317,595, dated May 12, 1885.

Application filed December 4, 1883. (No model.)

*To all whom it may concern:*

Be it known that I, JAMES M. THOMPSON, a citizen of the United States, residing at Garrison, in the county of Benton and State of Iowa, have invented a new and useful Improvement in Clover-Hullers, of which the following is a specification.

In the accompanying drawings, Figure 1 is an end view of a thrashing-cylinder and my concave segments, the latter having my improved teeth therein. Fig. 2 is a top view of a detached segment of the concave with narrow teeth therein, a part of the segment being provided with holes therein for inserting the shanks of the teeth. Fig. 3 represents a view of the succeeding segment, similar to that shown in Fig. 2, having wider teeth. Fig. 4 is a view of the rearmost segment, having continuous or very wide teeth. Figs. 5, 6, and 7 represent side views of the teeth represented in Figs. 2, 3, and 4, respectively.

My invention consists in a novel construction of clover-huller, which will be fully understood from the following description and claims.

In the accompanying drawings, A, Fig. 1, represents an end view of a thrashing-cylinder provided with teeth B, of ordinary construction. Below this cylinder is represented a concave, C, accompanied with any suitable feed-apron D. The concave is made in segments, as shown in Figs. 2, 3, and 4, and may have holes $e$, to receive the shanks $f$ of the teeth, which may be otherwise fastened, if desired. The first or receiving segment of this concave, Fig. 2, is provided with narrow teeth having their sides roughened, as shown in Fig. 5. The two rows of teeth E are set alternately or with the teeth of one row opposite the spaces between the teeth in the adjoining row, in order the better to chafe and cut the clover-heads and straw without clogging.

The two rows of teeth of the second segment (represented in Fig. 3) are set in a similar manner. They are broader in the line of travel of the material than the teeth in the first section, and the two rows of teeth are set closer together, and their sides are roughened, as shown in Fig. 6, so that the attrition is increased. In the third or rearmost segment, Fig. 4, there is but a single row of teeth or ribs extending clear across the segment, and with only space enough left between them to permit the sweeping through of the cylinder-teeth and the partially-reduced material, which is thus subjected to a more severe and continuous rubbing action than in the previous sections. These ribs or teeth are also roughened on their sides, as seen in Fig. 7.

The arrangement of the teeth in the three successive and differing segments of the concave gives a progressive increase of the rubbing action as the reduction of the clover-heads and straw progresses, and thus completely accomplishes the work of hulling with great facility.

My improved concave and teeth may be made as an attachment to an ordinary thrashing-machine, to be substituted for the thrashing-concave when clover is to be hulled.

Having thus described my invention, what I claim, is—

1. The combination of the toothed cylinder and toothed hulling-concave, the teeth of said concave being roughened, and those on the receiving portion of the concave being set or spaced farther apart both longitudinally and laterally than the next or successive rows or series, so that there will be an increase in the rubbing action as the reduction of the material progresses, substantially as set forth.

2. The combination of the toothed cylinder and the toothed hulling-concave, the teeth of said concave being roughened and progressively increasing in width in the direction of travel of the material, and decreasing in distance apart laterally, in order to increase the rubbing action as the reduction of the material progresses, substantially as set forth.

3. The combination of the toothed cylinder and the toothed hulling-concave, said concave being composed of one or more segments having short roughened teeth in successive rows, the teeth of one row being laterally set so as to range alternately with those of the adjacent row, and a succeeding segment provided with roughened teeth made wider in the direction or line of travel and more closely set together in a lateral direction than those of preceding segment, so as gradually to decrease the space between the teeth, and thus increase the rubbing action as the reduction of the material progresses, substantially as described.

4. The combination, with the toothed cylinder, of the receiving segment having the rows of teeth E, set alternately in a lateral direction and wide apart in the direction of travel, the succeeding segment having rows of alternating teeth E', wider in the direction of travel than those of the first segment, and also set closer together in the same direction, and the rear segment, provided with ribs or teeth E'', wider in the direction of travel than those of the preceding segment, for the purposes specified.

In testimony that I claim the above as my invention I hereunto subscribe my name in the presence of two witnesses.

JAMES M. THOMPSON.

Witnesses:
H. L. GRAKL,
G. K. COVERT.